United States Patent
Turon

(10) Patent No.: US 10,667,111 B2
(45) Date of Patent: *May 26, 2020

(54) VIRTUAL ADDRESSING FOR MESH NETWORKS

(71) Applicant: Google LLC, Mountain View, CA (US)

(72) Inventor: Martin A. Turon, Berkeley, CA (US)

(73) Assignee: Google LLC, Mountain View, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 16/258,194

(22) Filed: Jan. 25, 2019

(65) Prior Publication Data

US 2019/0159006 A1 May 23, 2019

Related U.S. Application Data

(63) Continuation of application No. 15/232,040, filed on Aug. 9, 2016, now Pat. No. 10,231,108.

(60) Provisional application No. 62/266,246, filed on Dec. 11, 2015.

(51) Int. Cl.

| | |
|---|---|
| H04W 4/80 | (2018.01) |
| H04L 9/32 | (2006.01) |
| H04L 29/12 | (2006.01) |
| H04W 12/10 | (2009.01) |
| H04L 9/06 | (2006.01) |
| H04W 84/18 | (2009.01) |
| H04L 29/06 | (2006.01) |
| H04W 12/00 | (2009.01) |

(52) U.S. Cl.
CPC ............ *H04W 4/80* (2018.02); *H04L 9/0637* (2013.01); *H04L 9/3242* (2013.01); *H04L 61/2038* (2013.01); *H04W 12/10* (2013.01); *H04L 63/123* (2013.01); *H04L 63/126* (2013.01); *H04W 12/00512* (2019.01); *H04W 84/18* (2013.01)

(58) Field of Classification Search
None
See application file for complete search history.

(56) References Cited

U.S. PATENT DOCUMENTS 9,154,327 B1 * 10/2015 Marino .................. G06Q 30/04
10,231,108 B2    3/2019 Turon
(Continued)

OTHER PUBLICATIONS

"First Action Interview Office Action", U.S. Appl. No. 15/232,040, dated Jul. 13, 2018, 4 pages.
(Continued)

*Primary Examiner* — Thinh D Tran
(74) *Attorney, Agent, or Firm* — Colby Nipper PLLC

(57) ABSTRACT

In embodiments of virtual addressing for mesh networks, a node in a mesh network publishes packets and/or subscribes to packets using a virtual address that is derived from a unique identifier. The unique identifier has a larger address space than the destination address field of the packet. The unique identifier and an application key are hashed to elide the unique identifier from the destination address that is transmitted in the packet over the mesh network. A node receiving the packet can determine that the address is a virtual address, and disambiguate the destination address to determine that the virtual address corresponds to a unique identifier known to the receiving node.

20 Claims, 9 Drawing Sheets

(56) References Cited

U.S. PATENT DOCUMENTS

| | | | |
|---|---|---|---|
| 2003/0204728 A1* | 10/2003 | Irwin | H04L 63/126 |
| | | | 713/176 |
| 2005/0125692 A1 | 6/2005 | Cox et al. | |
| 2006/0020807 A1* | 1/2006 | Aura | H04L 9/3236 |
| | | | 713/176 |
| 2007/0206535 A1 | 9/2007 | Sood et al. | |
| 2010/0265824 A1* | 10/2010 | Chao | H04L 12/66 |
| | | | 370/235 |
| 2011/0317703 A1* | 12/2011 | Dunbar | H04L 45/74 |
| | | | 370/392 |
| 2016/0183046 A1 | 6/2016 | Kwon | |
| 2017/0289812 A1* | 10/2017 | Werb | H04W 4/70 |

OTHER PUBLICATIONS

"Notice of Allowance", U.S. Appl. No. 15/232,040, dated Oct. 31, 2018, 11 pages.

"Pre-Interview Communication", U.S. Appl. No. 15/232,040, dated Feb. 23, 2018, 5 pages.

* cited by examiner

VIRTUAL ADDRESSING FOR MESH NETWORKS

CROSS REFERENCE TO RELATED APPLICATIONS

This application is a continuation application claiming priority under 35 U.S.C. § 120 to U.S. patent application Ser. No. 15/232,040, filed on Aug. 9, 2018, which claims priority under 35 U.S.C. § 119(e) to U.S. Provisional Patent Application Ser. No. 62/266,246, filed Dec. 11, 2015, the disclosure of which is incorporated by reference herein in its entirety.

BACKGROUND

Using wireless mesh networking to connect devices to each other, and to cloud-based services, is increasingly popular for sensing environmental conditions, controlling equipment, and providing information and alerts to users. A mesh network device may have a number of capabilities that an application may want to access, such as receiving sensor data or controlling an actuator. Addressing in mesh networks is typically done at the device or node level. Addressing an individual capability within a mesh network device increases the amount of addressing payload in mesh network packets in order to specify an address for the capability and the node. However many devices on mesh networks are designed to operate for extended periods of time on battery power, which limits the available computing, user interface, and radio resources in the devices. Increasing the size of addresses, to address the node and a capability, in turn leads to transmitting larger packets over the mesh network, which increases power consumption and reduces network capacity.

Many applications are structured to send requests for data in order to receive a response that includes the requested data. Sending periodic requests for sensor data from an application, on one mesh network device to another mesh network device, increases overall network traffic as both requests and responses are transmitted over the mesh network. Network addressing techniques limit the efficiency and flexibility of accessing information and controls while maintaining power efficiency and secure communications over mesh networks.

SUMMARY

This summary is provided to introduce simplified concepts of virtual addressing for mesh networks, generally related to addressing and routing. The simplified concepts are further described below in the Detailed Description. This summary is not intended to identify essential features of the claimed subject matter, nor is it intended for use in determining the scope of the claimed subject matter.

Virtual addressing for mesh networks, generally related to addressing packets in a mesh network, is described. In embodiments, a node in the mesh network hashes a unique identifier (UID) to form a UID hash and generates a key identifier that encrypts an application key. The node forms a virtual address that includes a portion of the UID hash. The node then inserts the formed virtual address in a destination address field in a header of a packet, and transmits the packet over the mesh network.

Virtual addressing for mesh networks, generally related to addressing packets in a mesh network, is described. In embodiments, a system is described that includes a destination node that receives a packet over a mesh network and determines from an address type indicator in the received packet that the destination address field in a header of the packet includes a virtual address. The destination node disambiguates the virtual address in the received packet using a known unique identifier (UID) to determine that the virtual address corresponds to the known UID. The destination node authenticates a packet payload using the UID as additional data in the authentication.

Virtual addressing for mesh networks, generally related to addressing packets in a mesh network, is described. In embodiments, a source node device of a mesh network is commissioned with a unique identifier (UID) associated with an application. The node inserts data from the application into an application payload of a packet and generates a virtual address for the destination address of the packet, using the UID associated with the application in the generation of the virtual address. The source node inserts the generated virtual address into a destination address field of the header of the packet. The source node can then transmit the packet over the mesh network to publish the data to one or more destination nodes subscribing to the data published to the virtual address.

BRIEF DESCRIPTION OF THE DRAWINGS

Embodiments of virtual addressing for mesh networks are described with reference to the following drawings. The same numbers are used throughout the drawings to reference like features and components.

DETAILED DESCRIPTION

Figure 1:
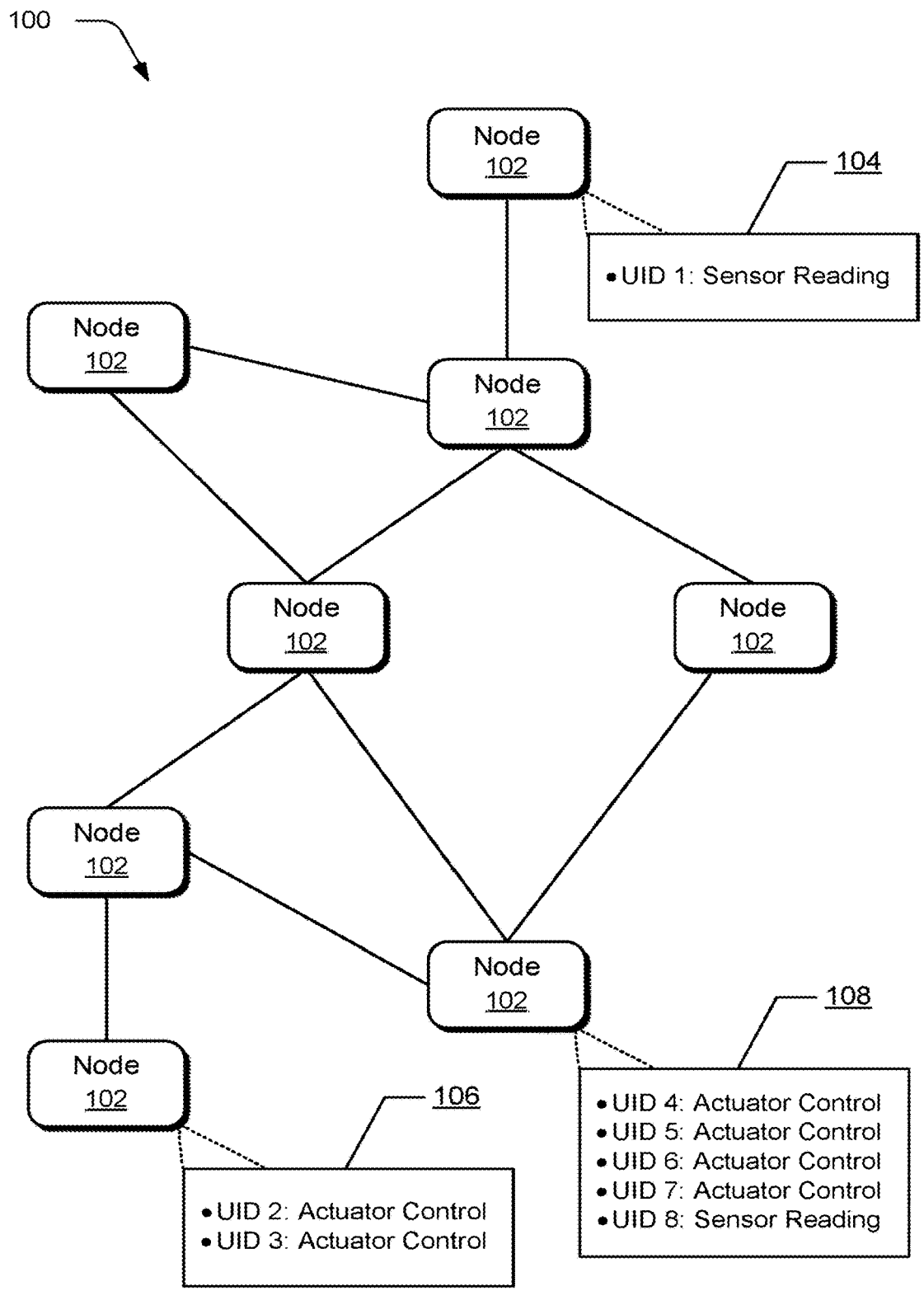
FIG. 1 illustrates an example mesh network system in which various embodiments of virtual addressing for mesh networks can be implemented.

Wireless mesh networks are communication networks having wireless nodes connected in a mesh topology that provides reliable and redundant communication paths for traffic within the mesh network. Wireless mesh networks use multiple radio links, or hops, to forward traffic between devices within the mesh network. This provides coverage for areas larger than the area covered by a single radio link.

Wireless mesh networks can be based on proprietary technologies, or standards-based technologies. For example, wireless mesh networks may be based on the IEEE 802.15.4 standard, which defines physical (PHY) layer and Media Access Control (MAC) layer features and services for use by applications at higher layers of a mesh networking stack. Upper-layer applications rely on these standards-defined services to support addressing and routing of packet data to support application-level communication across a mesh network and between the mesh network and external networks.

Similarly other wireless mesh network technologies, such as Bluetooth®, Thread®, ZigBee®, Z-Wave®, Bluetooth® Low Energy (BLE), have similar layered networking stacks. For example, BLE defines an application layer, a transport layer, a network layer, and a bearer layer. The bearer layer defines how network messages are transported between nodes of the mesh network. The network layer defines how messages are addressed to mesh network nodes, defines the network message format that is transported by the bearer layer, and defines how the application payload is included with the network message. The transport layer defines the format of the application payload and how the application payload is encrypted and authenticated. The application layer defines how applications use the transport layer and defines the operations and behavior of applications.

In some wireless standards, a particular capability or a group of capabilities in a node may be included in a profile or a model for a particular function or application. To address a specific capability, an identifier of the profile or the profile and the capability within the profile are included in the payload of a message to the node. Including this additional information profile and capability identification increases the amount of data that is transmitted to send a command or receive data.

While many technologies have been developed for addressing and routing packets in networks, these technologies address packets to the node or mesh network device, and not to a particular capability or sub-address within the node. Addresses for nodes in a mesh network may be globally unique, such as radio addresses, or addresses may be assigned locally within a particular mesh network, such as by a leader or controller node, or by using random processes with collision detection. Assigning exactly one globally unique network address to a node has benefits for scalability of flood routing, as relay caches can track whether a message has been heard from a particular node, and squelch excess forwarding of flood messages. However, these approaches assign an address to the device or node as a whole without assigning unique addresses (sub-addresses) to any of the particular capabilities with each mesh network node.

For example, a mesh network may include a node (i.e., a mesh network device) with a number of capabilities for sensing and/or actuation. An application running on another node may only be interested in receiving data from one of a number of sensors in the node, controlling a single actuator in the node, controlling a combination of some of the actuators in the node, or controlling any arbitrary combination of actuators in a number of nodes. Adding additional addressing information to a mesh network packet to facilitate sub-addressing the capabilities in the nodes increases packet length, which in turn increases transmission time for the packet, increases power consumption, and decreases network efficiency.

Addressing a data packet based on a unique identifier (UID) that is unique to a capability or a sub-address of a node provides addressing that is finer grained than addressing at the node level. The unique identifiers (UIDs) are compressed to a shorter-form virtual address that is inserted in a destination address field of a header of the mesh network packet. By eliding the longer-form UID in the mesh network packet and using the virtual address, network efficiency is improved and battery life for the nodes is increased.

Applications on a node that are structured to send periodic requests for sensor data to another node increase overall network traffic as both requests and responses are transmitted over the mesh network. By associating one or more capabilities of a node with a UID, an application publishes information for the capability, such as a sensor reading, using the virtual address. Packets with virtual addresses are relayed across the mesh network, so that any node that requires the sensor reading subscribes to that virtual address to receive the information. By publishing and subscribing with virtual addresses, requests for information are reduced and network efficiency is improved.

Virtual addresses are also associated with capabilities in nodes that have actuator controls. For example, an application for a network-connected power strip associates a UID with each switched socket in the power strip. Any node can then send a control command to the virtual address of any socket. Also, sockets in a single power strip or multiple power strips may be grouped together and associated with a UID to let an application control the group of sockets with a single command to the virtual address associated with the UID for the group of sockets.

While features and concepts of the described systems and methods for virtual addressing for mesh networks can be implemented in any number of different environments, systems, devices, and/or various configurations, embodiments of virtual addressing for mesh networks are described in the context of the following example devices, systems, and configurations.

FIG. 1 illustrates an example mesh network system 100 in which various embodiments of virtual addressing for mesh networks can be implemented. The mesh network 100 is a wireless mesh network that includes nodes 102. The nodes 102 are mesh network devices, as described below with respect to FIG. 9, which include a mesh network interface for communication over the mesh network 100. The nodes 102 receive and transmit packet data over the mesh network interface. The nodes 102 also route, forward, and/or relay packets across the mesh network 100.

Each node 102 may include one or more capabilities, such as a sensor that provides readings or an actuator that can be controlled. For example, at 104 the node 102 is a node with a sensor. The node 102 with the sensor at 104 publishes readings from the sensor to a UID (shown as UID 1 at 104) that is associated with the sensor and readings from the sensor. Other nodes 102 that have applications interested in receiving the sensor readings, subscribe to UID 1 to receive the sensor readings over the mesh network 100.

At 106, a different node 102 has two actuator controls, each of which is associated with a UID (UID 2 and UID 3 at 106). Any node 102 that wants to control the actuators at 106, addresses a mesh network packet to the virtual address for the UID that is associated with the specific actuator, and includes an application payload with the settings for the actuator control. Any node 102 may have any number and combination of sensors and/or actuator controls. For example a different node 102 includes four actuator controls at 108 (UID 4, UID 5, UID 6, and UID 7) and a sensor reading (UID 8).

The assignment of UIDs to capabilities within the nodes 102 facilitates establishing connections at the application level in the nodes 102, where information, such as sensor readings and/or control settings, can be published to a UID and/or subscribed to using a UID. The publishing and subscribing of information by UID creates a software bus associated with each UID to exchange information between applications over the mesh network 100.

Figure 2:
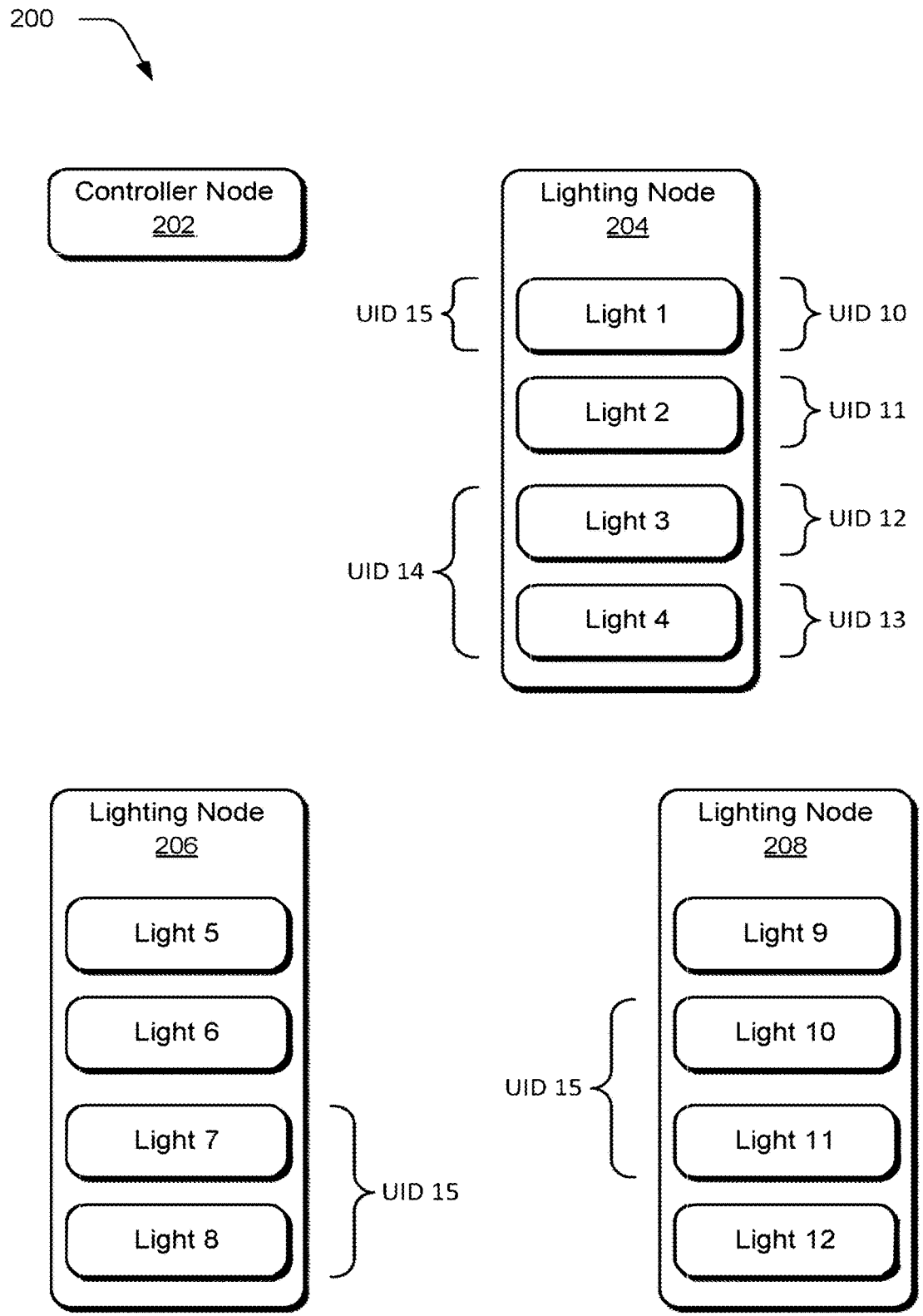
FIG. 2 illustrates an example environment in which various embodiments of virtual addressing for mesh networks can be implemented.

FIG. 2 illustrates an example environment 200 in which various embodiments of virtual addressing for mesh networks can be implemented. The environment 200 illustrates additional ways in which UIDs may be assigned across one or more of the nodes 102 in the mesh network 100, as shown and described with reference to FIG. 1.

A controller node 202 (e.g., an example of a node 102 in the mesh network 100) can control functions in various other nodes 102. For the sake of example, the controller node 202 is implemented as a lighting controller that is designed to control lights in lighting nodes 204, 206, and/or 208. UIDs are assigned to various lights and/or combinations of lights in one or more of the lighting nodes 204, 206, and/or 208. Individual lights in the lighting node 204 are assigned to UID 10, UID 11, UID 12, and UID 13. The controller node 202 controls the individual lights in the lighting node 204 by publishing control commands in a mesh network packet that is addressed to the respective virtual address of the UID of the light(s) being controlled.

Virtual addresses can also be used to address combinations of capabilities in a node 102. For example, the controller node 202 can control light 3 and light 4 in the lighting node 204 by publishing a command in a packet that is addressed to the virtual address for UID 14, which is assigned to controlling the combination of light 3 and light 4 with a single command.

Virtual addresses can also be used to address combinations of capabilities in multiple nodes 102. For example, the controller node 202 can control light 1 in the lighting node 204, lights 7 and 8 in the lighting node 206, and lights 10 and 11 in the lighting node 208 by publishing a command that is addressed to the virtual address for UID 15, which is assigned to controlling this combination of lights in the lighting nodes 204, 206, and 208. By publishing a command to a single virtual address, the controller node 202 sends a single mesh network packet to control the lights in the multiple lighting nodes 204, 206, and 208. The packet is relayed across the mesh network 100 in any suitable way, such as flooding the network by relaying the packet through multiple nodes 102 (not shown in FIG. 2 for the sake of clarity) of the mesh network 100 from the controller node 202 to the lighting nodes 204, 206, and 208.

Figure 3:
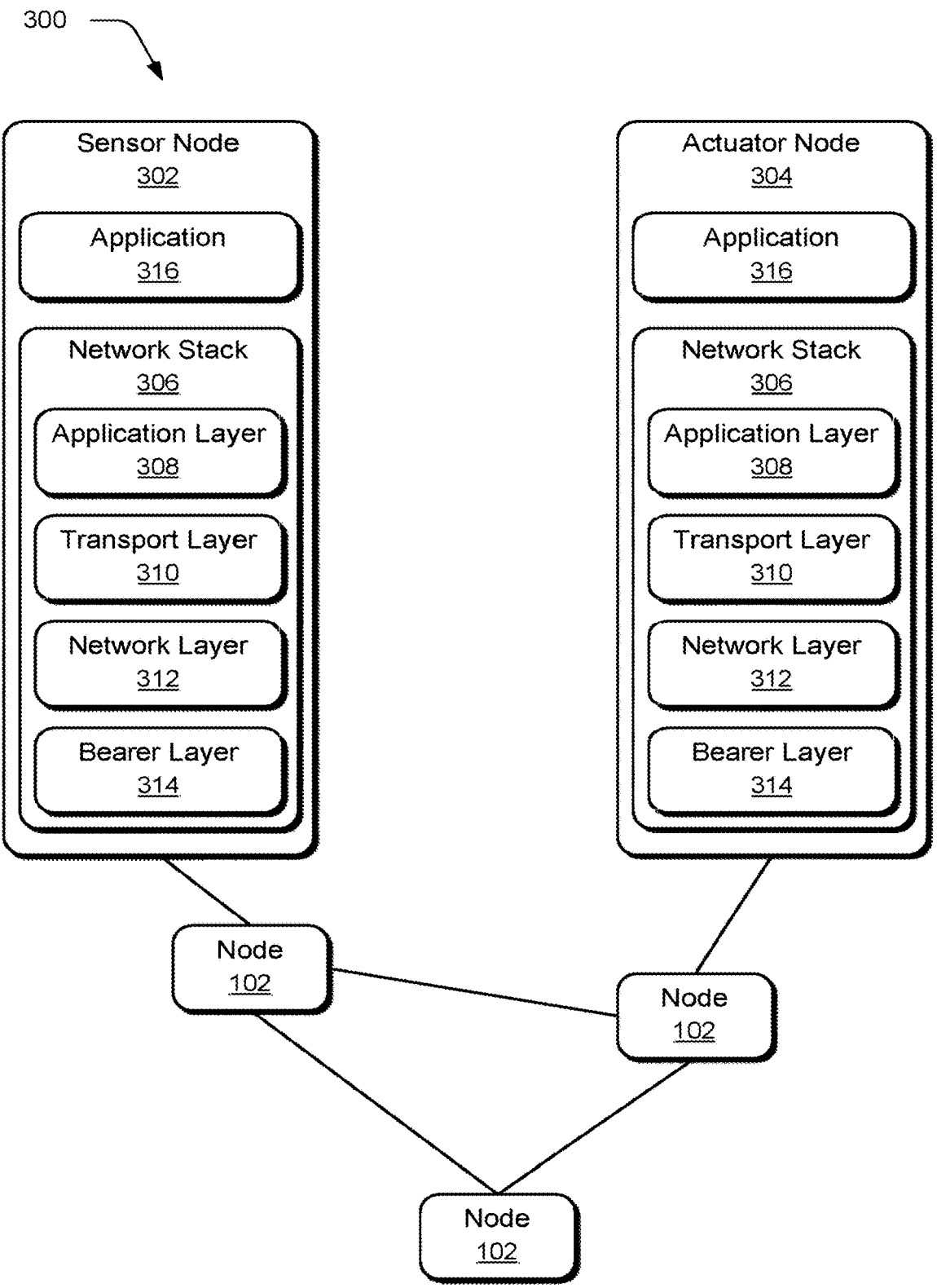
FIG. 3 illustrates a more detailed example environment in which various embodiments of virtual addressing for mesh networks can be implemented.

FIG. 3 illustrates an example environment 300 in which various embodiments of virtual addressing for mesh networks can be implemented. The environment 300 includes selected nodes 102 from the mesh network 100 to illustrate techniques of virtual addressing for mesh networks in greater detail.

Environment 300 illustrates two nodes 102 of the mesh network 100, as a sensor node 302, and an actuator node 304. The sensor node 302 and the actuator node 304 are shown as including a network stack 306 that is included in all of the nodes 102. The network stack 306 includes an application layer 308, a transport layer 310, a network layer 312, and a bearer layer 314. The network stack 306 is shown in this example with four layers, but as is well known, the network stack 306 may alternatively have fewer or more layers. The operations described with respect to specific layers below may alternatively be performed at other layers, partitioned between multiple layers, or combined from multiple layers to a single layer.

The sensor node 302 and the actuator node 304 include one or more applications 316 that use the network stack 306 to communicate over the mesh network 100. The application 316 is a logical grouping of related functions, which may also described as a model, a profile, a cluster, and so forth. For example, the application 316 in the sensor node 302 is a sensor application that manages functions of reading a sensor, processing the data read from the sensor, and publishing sensor readings to the UID associated with the sensor reading. The sensor reading of the sensor node 302 is published to the virtual address associated with the UID.

The application 316, in the sensor node 302, publishes the sensor reading by passing application data that will be included in a mesh network packet to the application layer 308 of the network stack 306. The application layer 308 defines how the application 316 uses the transport layer 310. The application layer 308 passes the application data and configuration information to the transport layer 310. The transport layer 310 defines how the application payload is encrypted and authenticated, as described in greater detail below.

The transport layer 310 sends the application payload to the network layer 312. The network layer 312 determines how the mesh network packet is addressed and how the application payload is included in the mesh network packet. The network layer 312 forms a destination address (DST) for the mesh network packet. If the application 316 provides a UID for the virtual address of the mesh network packet, the virtual address is generated, as described in detail below. The generated virtual address is inserted into the DST field of the packet. The network layer 312 sends the mesh network packet, including the virtual address and application payload, to the bearer layer 314. The bearer layer 314 transmits the mesh network packet over the mesh network 100.

The actuator node 304 receives the mesh network packet from the mesh network 100 at the bearer layer 314. The bearer layer 314 passes the received mesh network packet to the network layer 312. The network layer 312 determines that the destination address is a virtual address and disambiguates the virtual address in the destination address field of the mesh network packet to determine that the UID may correspond to the virtual address. If there is a non-zero probability that the UID is a possible match for any UIDs known to (i.e., subscribed to by) the actuator node 304, the network layer 312 sends the application payload from the packet to the transport layer 310. The UID may be compared against a list of precomputed virtual addresses that are known to the actuator node 304, by using a hash table, a binary search, a linear search, and so forth. The transport layer 310 performs the authentication process on the application payload, to confirm the virtual address is correctly addressing the actuator node 304, as described in detail below. After confirming the authenticity and the validity of the application payload, the transport layer 310 sends the application payload to the application 316 at the application layer 308 in the actuator node 304.

Figure 4:
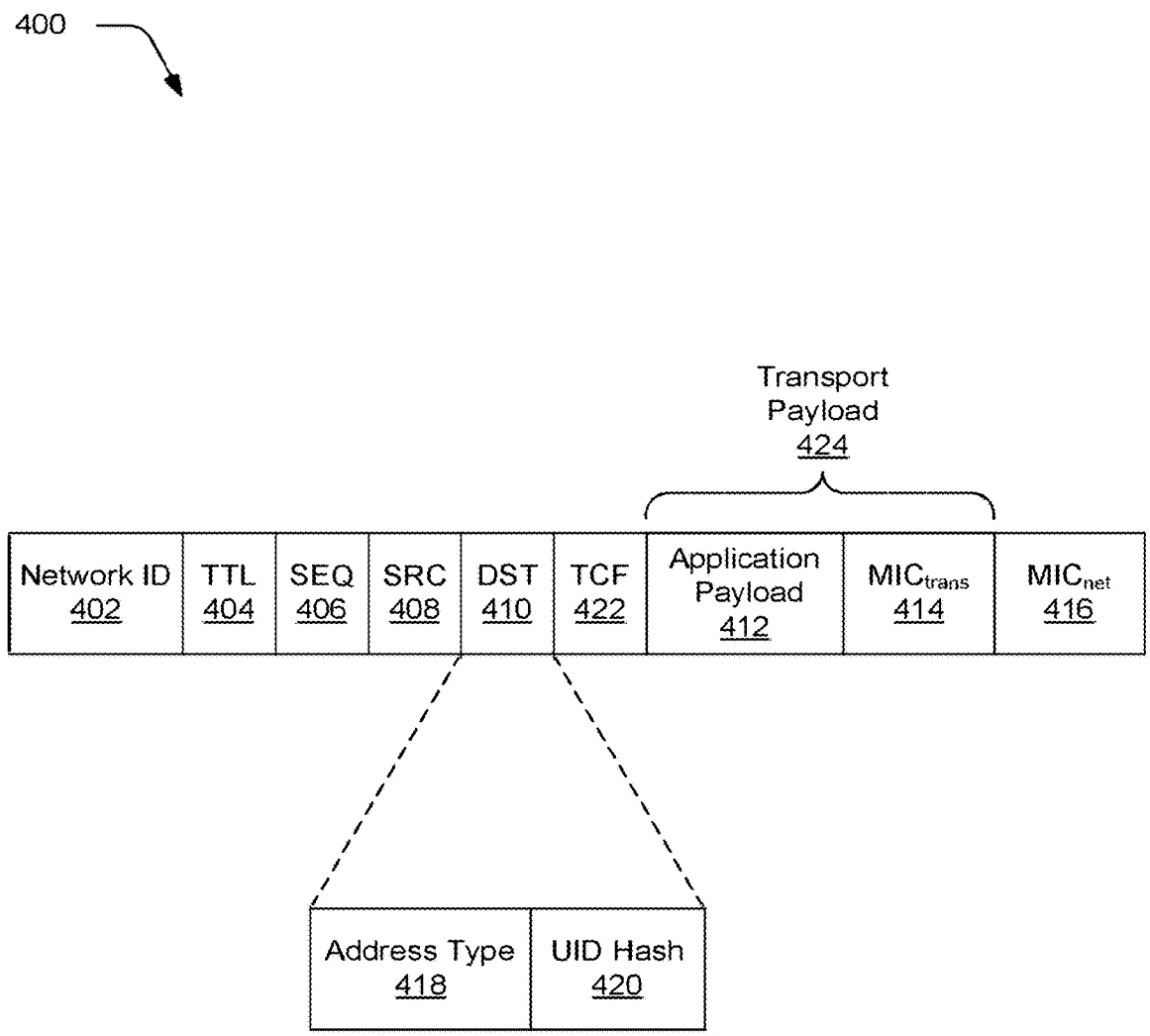
FIG. 4 illustrates an example mesh network packet for various embodiments of virtual addressing for mesh networks.

FIG. 4 illustrates an example mesh network packet 400 for various embodiments of virtual addressing for mesh networks techniques. The example packet 400 includes a number of fields, the contents of which are determined by the various layers of the network stack 306. The example packet 400 may be any type of wireless communication packet, such as a BLE advertisement packet, a ZigBee packet, an IEEE 802.15.4 packet, and so forth. The various fields in the packet 400 are shown for illustrative purposes and may vary in length and/or location within the packet 400.

A network identifier (Network ID) 402 may include various information added to the packet 400 by the bearer layer 314 and/or network layer 312. The network identifier 402 field may include synchronization information, such as a preamble and/or training sequence, a network identifier value, a packet priority, a network initialization vector, and so forth.

A Time-To-Live (TTL) 404 field includes a value that indicates the number of times the packet 400 may be forwarded across the mesh network 100. A sequence number (SEQ) 406 field includes a value that is incremented in the network layer 312 for every packet transmitted by each node 102. A receiving node 102 uses the sequence number 406 to reorder the packets 400 that are received out of order at the receiving node 102. The SEQ 406 is also used in the generation of nonce values that are used for replay protection and security purposes in the mesh network 100. A source address (SRC) 408 field includes the address of the source node 102 of the packet 400.

A destination address (DST) 410 field includes the destination address for the packet 400. The destination address 410 may include any one of a number of different address types, such as a local address, a device address, a group address, a virtual address, a unicast address, a multicast address, a broadcast address, and so forth.

The network identifier 402, the TTL 404, the SEQ 406, the SRC 408 and the DST 410 fields may be collectively referred to as the header (or packet header) of the packet 400. The packet header may include other fields as defined by any particular networking technology.

An application payload 412 includes data defined by an application 316 at the application layer 308. The application payload 412 may be encrypted using any suitable encryption techniques, such as Advanced Encryption Standard Counter with CBC-MAC (AES-CCM). A transport message integrity check (MIC$_{trans}$) 414 authenticates the application payload 412. A network message integrity check (MIC$_{net}$) 416 authenticates the destination address 410. The MIC$_{trans}$ 414 and the MIC$_{net}$ 416 are generated using any suitable hashing technique, such as AES-CCM. An identifier of an application key, used to encrypt the application payload 412, is included in a transport control field (TCF) 422.

The destination address 410 may be any one of various types of addresses including the virtual address. The DST 410 includes an address type 418 field that indicates the type of address in the DST 410. For example, the address type 418 is a bit field of any suitable length to label the type of the address in the DST 410. By way of example and not limitation, the address type 418 is the first two bits of the destination address 410, where a value of "11" indicates that the destination address 410 is a group address; a value of "10" indicates that the DST 410 is the virtual address, and so forth.

When the address type 418 indicates that the DST 410 is a virtual address, the DST 410 includes a UID hash 420. By way of example and not limitation, the bit field for the UID hash 420 is fourteen bits long, resulting in 16,384 possible values for the UID hash 420. The DST 410 is the concatenation of the address type 418 and the UID hash 420, shown in binary form as "0b 10vv vvvv vvvv vvvv," where "v" is a bit in the UID hash 420. Other lengths for the address type 418 and the UID hash 420 are contemplated.

To provide globally unique addresses to mesh network devices, the possible address space for nodes 102 is large enough to avoid mesh network interface address collisions between any two mesh network devices. Thus the address space represented in the UID is larger than can be directly addressed in the DST 410 in the packet 400. The UID is any arbitrary length, shared, unique identifier that is known to all nodes 102 and/or applications 316 using the UID. For example, the UID may be a 128-bit Universally Unique Identifier (UUID), a 64-bit Extended Unique Identifier (EUI-64), a 48-bit Media Access Control address (MAC-48), a 32-bit address, a 128-bit IPv6 address, a radio interface address, a null-terminated string or label, a JPEG image, and so forth.

Each UID is commissioned out-of-band of the mesh network 100 to the nodes 102. The applications 316 and the network stack 306 in the each node 102, which publish and subscribe using the UID, have access to the UID(s) commissioned to that node 102. Further description of commissioning techniques for the nodes 102 is out of the scope of this description.

To support a large number of applications using UIDs, while using the shorter DST 410 field for the virtual addresses, the UID is hashed to produce the UID hash 420 included in the DST 410. The UID is elided from the DST 410 by the hashing of the UID and a virtual address cryptographic salt to produce a short-form virtual address that is inserted into the DST 410 field of the packet 400. The hashing may be performed using any suitable cryptographic technique, such as Cipher-based Message Authentication Code (CMAC) and the like. The UID hash 420 in the DST 410 is generated by hashing the UID:

$$\text{UID-Hash} = \text{CMAC}(\text{UID}, \text{vtad}) \quad (1)$$

where vtad is the virtual address cryptographic salt.

The application payload 412 is authenticated and encrypted at the transport layer 310 before transmission using AES-CCM. For example, the application payload is encrypted and the MIC$_{trans}$ 414 is generated according to:

$$\text{encAppData}, \text{MIC}_{trans} = \text{AES-CCM}(\text{AppKey}, \text{application nonce}, \text{AppPayload}, \text{UID}) \quad (2)$$

where encAppData is the application payload 412, MIC$_{trans}$ is an the transport message integrity check 414, AppPayload is the unencrypted data for the application payload 412 provided by the application 316 and the application nonce is:

$$\text{application nonce} = \text{SEQ} \| \text{SRC} \| \text{DST} \| \text{IV Index} \quad (3)$$

where SEQ is the SEQ 406, SRC is the SRC 408, DST is the DST 410, and IV Index is a network initialization vector, a portion of which is included in the network identifier 402. The network initialization vector increments periodically to assure that the application nonce is guaranteed to be fresh. The network initialization vector is incremented to safely reset the SEQ 406 when the range of sequence numbers is exhausted.

The application key identifier included in the TCF 422 is generated by hashing the application key twice:

$$\text{key-identifier} = \text{CMAC}(\text{CMAC}(\text{AppKey}, \text{smat}), \text{smak}) \quad (4)$$

where AppKey is the application key, smat is a key-identifier cryptographic salt, and smak is a virtual address key cryptographic salt.

At the network layer 312 the network message integrity check 416 is generated to authenticate the destination address 410. The network message integrity check 416 is set by the network layer 312 at each node 102 that transmits or relays the packet 400. The network message integrity check 416 is generated by:

$$MIC_{net} = \text{AES-CCM(Encryption Key, network nonce, DST} \| \text{TransportPayload)} \quad (5)$$

where Encryption Key is an encryption key derived from a network key and the network nonce is:

$$\text{network nonce} = TTL \| SEQ \| SRC \| \text{IV Index} \quad (6)$$

where TTL is TTL 404.

When hashing the UID address space into the smaller virtual address, there is a probability that there will be collisions between some of the resulting virtual addresses. With fourteen bits allocated to the UID hash 420 that contains the hash of the UID, the probability of a collision between the UID hashes 420 is one in 16,384. After reception and validation of the packet 400 at the bearer layer 314 and the network layer 312, the packet 400 is passed to the transport layer 310 of the receiving node 102. The transport layer 310 disambiguates the DST 410 to confirm that the message in the packet 400 authenticates against a known application key and a known UID. The transport layer 310 disambiguates the DST 410, using equation (4), to compare the application key decrypted from the key identifier 420 against one or more application keys known to the receiving node 102 and using equation (1), to determine that the decrypted UID is one of one or more UIDs known to the receiving node 102.

The transport layer 310 uses the $MIC_{trans}$ 414 to authenticate that the received application payload. The transport layer 310 compares the $MIC_{trans}$ 414 in the packet 400 to a result of a calculation using equation (2). If the result of the comparison does not match, the application payload is discarded. If the comparison results in a match, then the authentication indicates that the received application payload is intended for the application associated with the known UID and the application payload has not been altered.

If the destination address authenticates against a known application key and a known UID, and the application payload is authenticated, the message is passed from the transport layer 310 to the application layer 308. If there is no match to a known application key and/or UID, the received packet 400 is silently discarded.

The combination of using the $MIC_{trans}$ 414 and the UID hash 420 results in a low probability of erroneous application payload information reaching the application 316, while reducing the size of the destination address required to communicate the UID. This low error probability results from assigning virtual addresses based on large random numbers to dynamically pair mesh network nodes 102, while eliminating the need to maintain a central entity in the mesh network 100 to statically assign unique addresses and ensure no duplicate addresses are assigned. For example, there are $2^{32}$ possible values for the 32-bit $MIC_{trans}$ 414 and $2^{14}$ possible values for a fourteen-bit UID hash 420. The resulting probability of erroneous application payload reaching an application is 1 in $2^{46}$.

Example methods 500 through 700 are described with reference to respective FIGS. 5-7 in accordance with one or more embodiments of virtual addressing for mesh networks. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
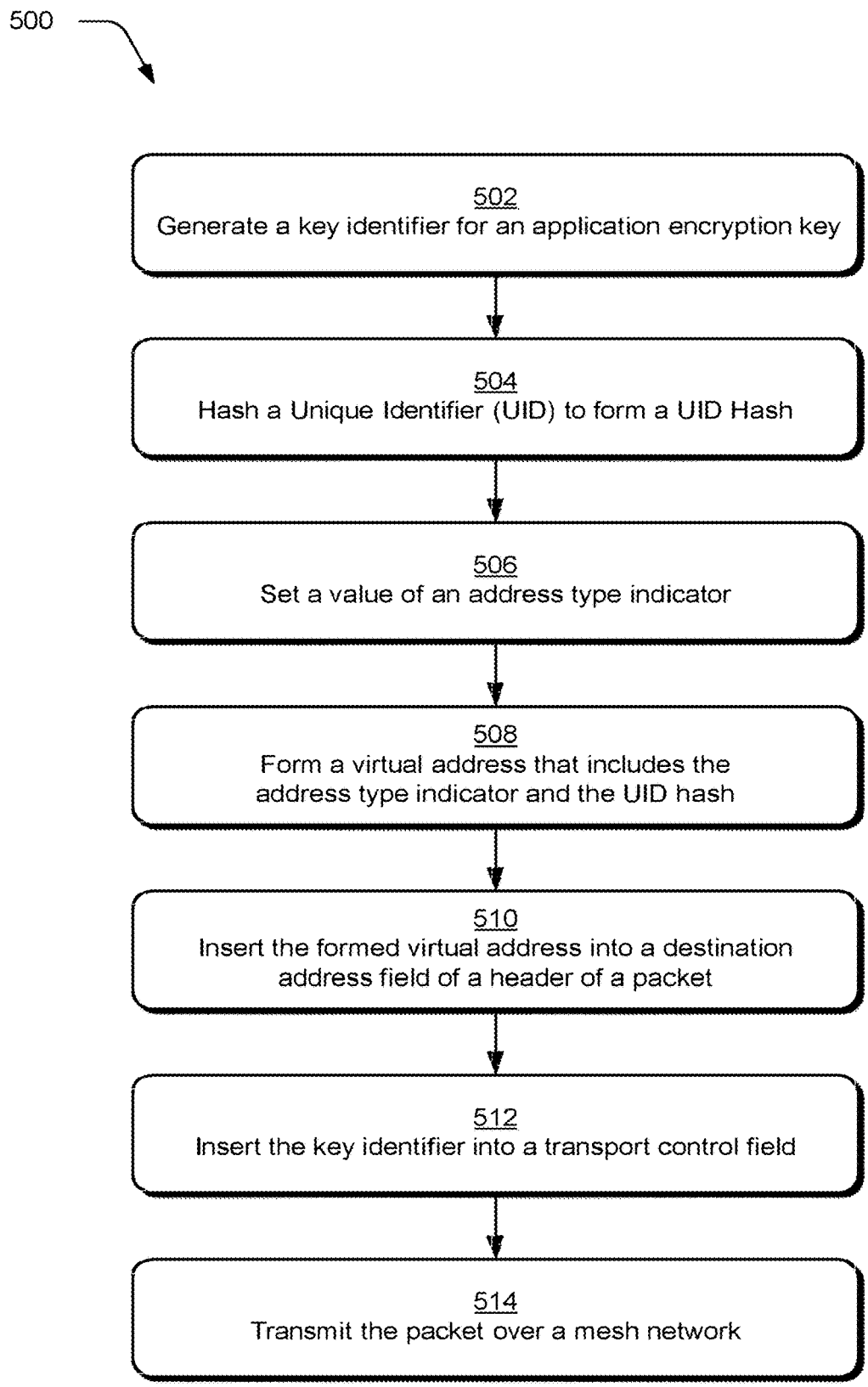
FIG. 5 illustrates an example method of virtual addressing for mesh networks in accordance with embodiments of the techniques described herein.

FIG. 5 illustrates example method(s) 500 of virtual addressing for mesh networks. The order in which the method blocks are described are not intended to be construed as a limitation, and any number of the described method blocks can be combined in any order to implement a method, or an alternate method.

At block 502, a node generates a key identifier that identifies an encryption key associated with an application key. For example, a node 102 of the mesh network 100 uses a hash function to hash an application key with the key-identifier cryptographic salt to form an intermediate hash of the application key. The node 102 uses the hash function to hash the intermediate hash of the application key with the virtual address key cryptographic salt to form the key identifier.

At block 504, the node hashes a unique identifier (UID) to form a UID hash. For example, the node 102 uses the hash function to hash a UID with the virtual address cryptographic salt to form a UID hash 420.

At block 506, the node sets a value of an address type indicator to indicate that a destination address in a mesh network packet is a virtual address. For example, the node 102 sets a value of the address type 418 to indicate that the DST 410 is a virtual address.

At block 508, the node forms a virtual address that includes the address type and the UID hash. For example, the node 102 concatenates the address type 418 and the UID hash 420 to form a virtual address.

At block 510, the node inserts the virtual address into a destination address field of a header of the mesh network packet, at 512 the node inserts the key identifier into a transport control field, and at 514, the node transmits the mesh network packet over a mesh network. For example, the node 102 inserts the virtual address into the DST 410 field of the packet 400, inserts the key identifier into the TCF 422, and transmits the packet 400 over the mesh network 100.

Figure 6:
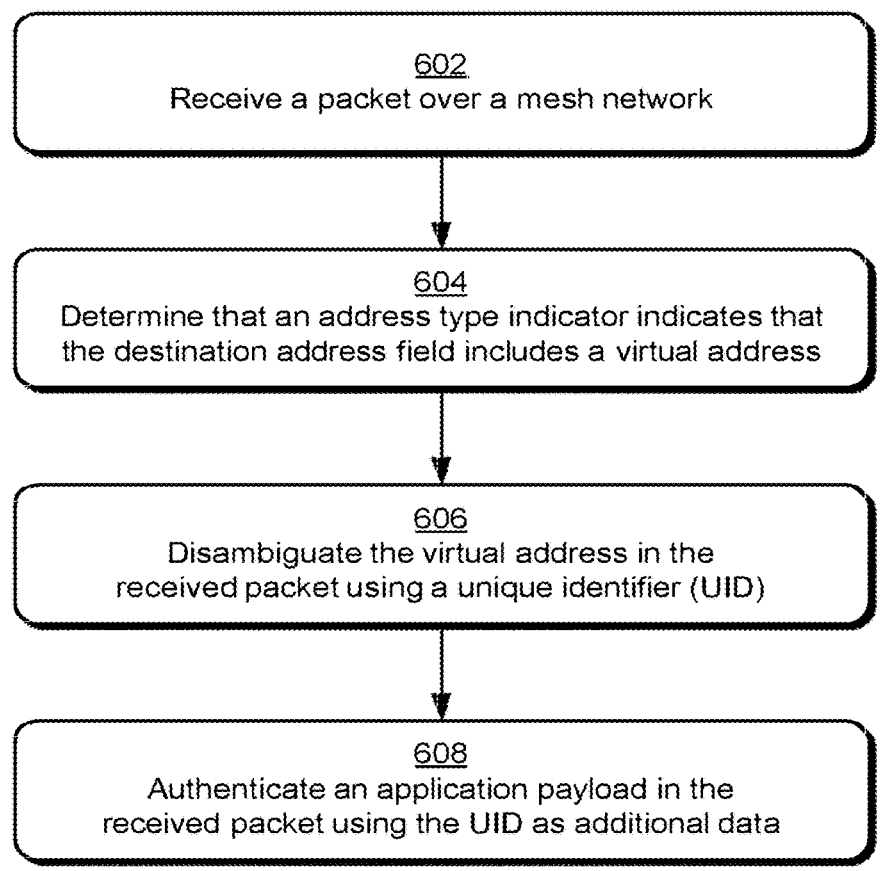
FIG. 6 illustrates another example method of virtual addressing for mesh networks in accordance with embodiments of the techniques described herein.

FIG. 6 illustrates example method(s) 600 of virtual addressing for mesh networks. The order in which the method blocks are described are not intended to be construed as a limitation, and any number of the described method blocks can be combined in any order to implement a method, or an alternate method.

At block 602, a node receives a packet over a mesh network, and at 604 the node determines that an address type indicator indicates that the destination address field of the packet includes a virtual address. For example, a node 102 receives a packet 400 over the mesh network 100. The node 102 determines from the value in the address type 418 included in the DST 410 that the destination address in the DST 410 is a virtual address.

At block 606, the node disambiguates the virtual address in the received packet using a unique identifier (UID). For example, the node 102 disambiguates a UID hash 420 in the DST 410 by using a UID known to the node 102. The node 102 hashes the known UID and compares the result of the hash operation with the UID hash 420 in the received packet 400 to disambiguate the virtual address. The UID may be compared against a list of precomputed virtual addresses that are known to the actuator node 304, by using a hash table, a binary search, a linear search, and so forth.

At block 608, the node authenticates an application payload in the received packet using the UID as additional data. For example, the node 102 authenticates the application payload 412 in the packet 400 using the UID known to the node 102. The node 102 hashes the application payload 412 using the known UID as additional data for the hash operation and compares the result of the hash operation with a $MIC_{trans}$ 414 in the received packet to authenticate the application payload 412.

Figure 7:
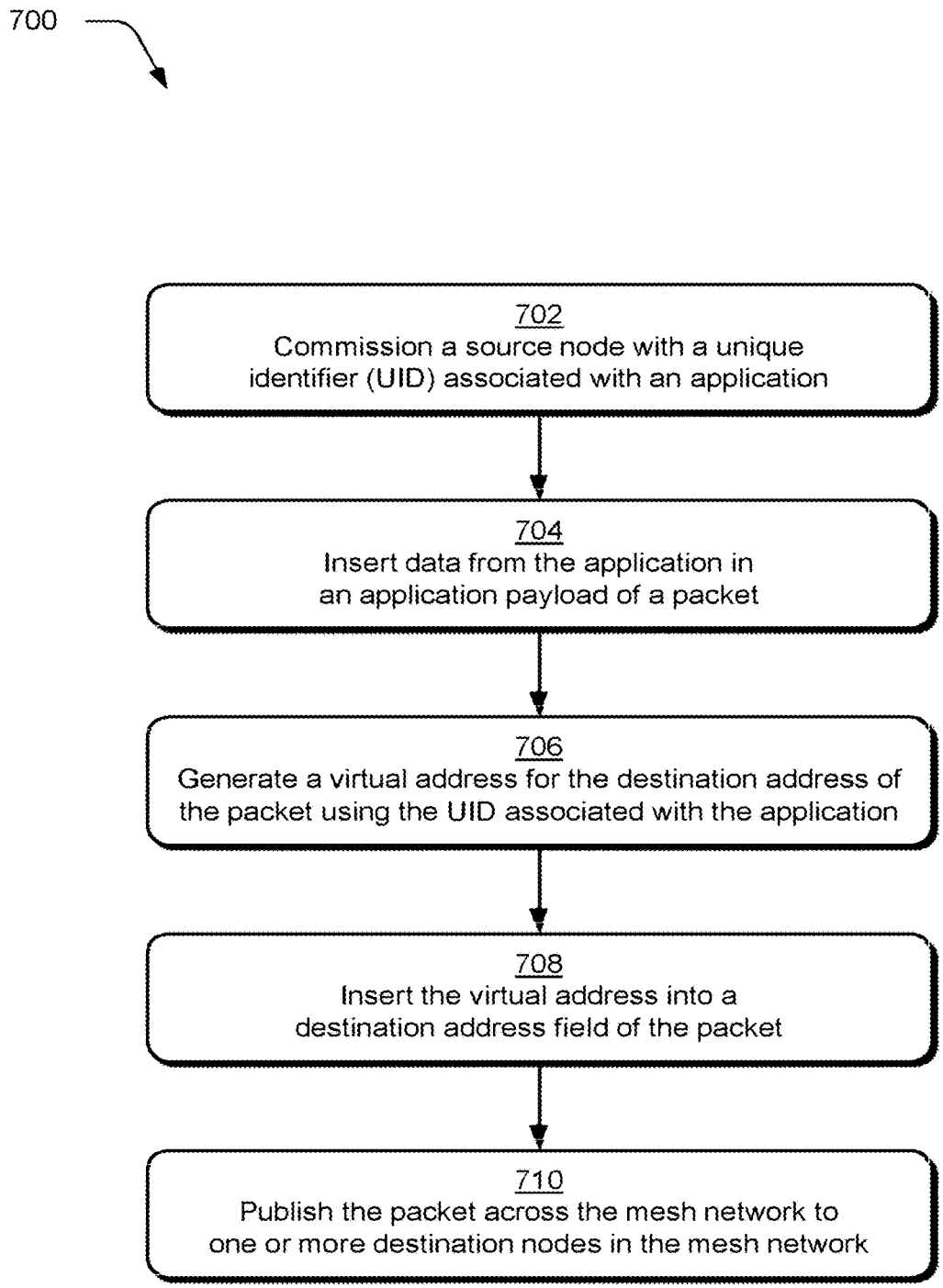
FIG. 7 illustrates an example method of virtual addressing for mesh networks related to publishing data and subscribing to data using virtual addresses in a mesh network in accordance with embodiments of the techniques described herein.

FIG. 7 illustrates example method(s) 700 of virtual addressing for mesh networks related to publishing data and subscribing to data using virtual addresses in a mesh network. The order in which the method blocks are described are not intended to be construed as a limitation, and any number of the described method blocks can be combined in any order to implement a method, or an alternate method.

At block 702, a source node is commissioned with a unique identifier that is associated with an application. For example, a node 102 is commissioned with a unique identifier (UID) that is associated with an application 316.

At block 704, the source node inserts data from the application into an application payload field of a packet. For example, the application 316 provides data to the application layer 308, which the application layer 308 inserts into the application payload 412 field of a packet 400.

At block 706, the source node generates a virtual address, using the unique identifier associated with the application, for a destination address of the packet. For example, the node 102 generates a virtual address for the DST 410 of the packet 400 using the UID to generate the virtual address.

At block 708, the source node inserts the virtual address into a destination address field of the mesh network packet, and at block 710, the source node publishes the packet by transmitting the packet to one or more destination nodes in the mesh network. For example, the node 102 inserts the virtual address into the DST 410 field of the packet 400 and the node 102 publishes the packet by transmitting the packet 400 over the mesh network 100.

Figure 8:
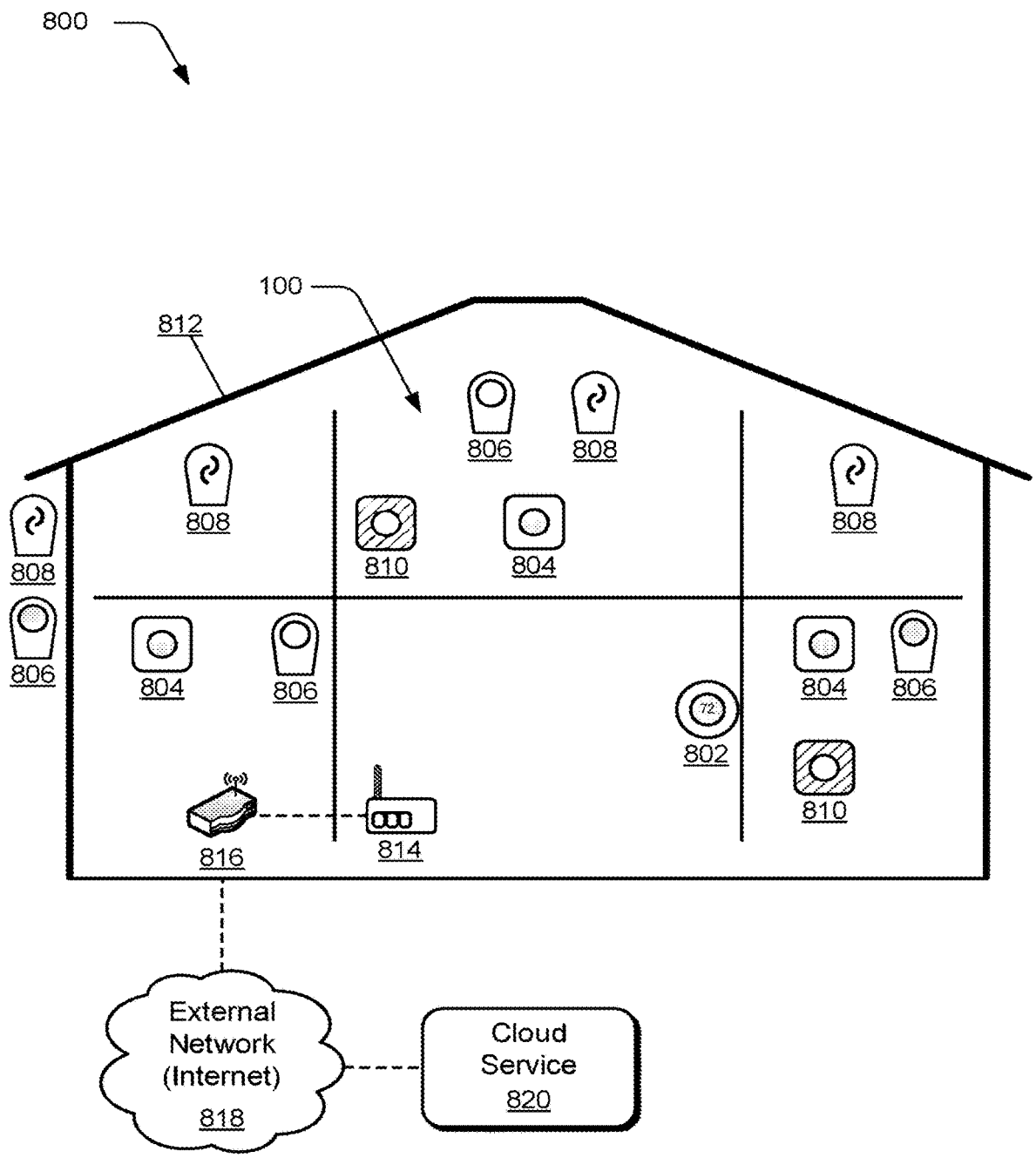
FIG. 8 illustrates an example environment in which a mesh network can be implemented in accordance with embodiments of the techniques described herein.

FIG. 8 illustrates an example environment 800 in which the mesh network 100 (as described with reference to FIG. 1), and embodiments of virtual addressing for mesh networks can be implemented. Generally, the environment 800 includes the mesh network 100 implemented as part of a smart-home or other type of structure with any number and type of mesh network devices that are configured for communication in a mesh network. For example, the mesh network devices can include a thermostat 802, hazard detectors 804 (e.g., for smoke and/or carbon monoxide), cameras 806 (e.g., indoor and outdoor), lighting units 808 (e.g., indoor and outdoor), and any other types of mesh network devices 810 that are implemented inside and/or outside of a structure 812 (e.g., in a smart-home environment). In this example, the mesh network devices can also include any of the previously described devices, such as a node 102.

In the environment 800, any number of the mesh network devices can be implemented for wireless interconnection to wirelessly communicate and interact with each other. The mesh network devices are modular, intelligent, multi-sensing, network-connected devices, which can integrate seamlessly with each other and/or with a central server or a cloud-computing system to provide any of a variety of useful smart-home objectives and implementations. An example of a mesh network device that can be implemented as any of the devices described herein is shown and described with reference to FIG. 9.

In implementations, the thermostat 802 may include a Nest® Learning Thermostat that detects ambient climate characteristics (e.g., temperature and/or humidity) and controls a HVAC system in the smart-home environment. The learning thermostat 802 and other smart devices "learn" by capturing occupant settings to the devices. For example, the thermostat learns preferred temperature set-points for mornings and evenings, and when the occupants of the structure are asleep or awake, as well as when the occupants are typically away or at home.

A hazard detector 804 can be implemented to detect the presence of a hazardous substance or a substance indicative of a hazardous substance (e.g., smoke, fire, or carbon monoxide). In examples of wireless interconnection, a hazard detector 804 may detect the presence of smoke, indicating a fire in the structure, in which case the hazard detector that first detects the smoke can broadcast a low-power wake-up signal to all of the connected mesh network devices. The other hazard detectors 804 can then receive the broadcast wake-up signal and initiate a high-power state for hazard detection and to receive wireless communications of alert messages. Further, the lighting units 808 can receive the broadcast wake-up signal and activate in the region of the detected hazard to illuminate and identify the problem area. In another example, the lighting units 808 may activate in one illumination color to indicate a problem area or region in the structure, such as for a detected fire or break-in, and activate in a different illumination color to indicate safe regions and/or escape routes out of the structure. In another example, a doorbell or door monitoring system may include LEDs that flash yellow (or other color) when a presence is detected, or flash red if an alarm is activated.

In various configurations, the mesh network devices 810 can include an entryway interface device that functions in coordination with a network-connected door lock system, and that detects and responds to a person's approach to or departure from a location, such as an outer door of the structure 812. The entryway interface device can interact with the other mesh network devices based on whether someone has approached or entered the smart-home environment. An entryway interface device can control doorbell functionality, announce the approach or departure of a person via audio or visual means, and control settings on a security system, such as to activate or deactivate the security system when occupants come and go. The mesh network devices 810 can also include other sensors and detectors, such as to detect ambient lighting conditions, detect room-occupancy states (e.g., with an occupancy sensor), and control a power and/or dim state of one or more lights. In some instances, the sensors and/or detectors may also control a power state or speed of a fan, such as a ceiling fan. Further, the sensors and/or detectors may detect occupancy in a room or enclosure, and control the supply of power to electrical outlets or devices, such as if a room or the structure is unoccupied.

The mesh network devices 810 may also include connected appliances and/or controlled systems, such as refrigerators, stoves and ovens, washers, dryers, air conditioners, pool heaters, irrigation systems, security systems, and so forth, as well as other electronic and computing devices, such as televisions, entertainment systems, computers, intercom systems, garage-door openers, ceiling fans, control panels, and the like. When plugged in, an appliance, device, or system can announce itself to the mesh network as described above, and can be automatically integrated with the controls and devices of the mesh network, such as in the smart-home. It should be noted that the mesh network devices 810 may include devices physically located outside of the structure, but within wireless communication range, such as a device controlling a swimming pool heater or an irrigation system.

The mesh network 100 includes a border router 814 that interfaces for communication with an external network, outside the mesh network 100. The border router 814 connects to an access point 816, which connects to a communication network 818, such as the Internet. A cloud service 820, which is connected via the communication network 818, provides services related to and/or using the devices within the mesh network 100. By way of example, the cloud service 820 can include applications for connecting end user devices, such as smart phones, tablets, and the like, to devices in the mesh network, processing and presenting data acquired in the mesh network 100 to end users, linking devices in one or more mesh networks 100 to user accounts of the cloud service 820, provisioning and updating devices in the mesh network 100, and so forth. For example, a user can control the thermostat 802 and other mesh network devices in the smart-home environment using a network-connected computer or portable device, such as a mobile phone or tablet device. Further, the mesh network devices can communicate information to any central server or cloud-computing system via the border router 814 and the access point 816. The data communications can be carried out using any of a variety of custom or standard wireless protocols (e.g., Wi-Fi, ZigBee for low power, BLE, 6LoW-PAN, etc.) and/or by using any of a variety of custom or standard wired protocols (CAT6 Ethernet, HomePlug, etc.).

Any of the mesh network devices in the mesh network 100 can serve as low-power and communication nodes to create the mesh network 100 in the smart-home environment. Individual low-power nodes of the network can regularly send out messages regarding what they are sensing, and the other low-powered nodes in the environment—in addition to sending out their own messages—can repeat the messages, thereby communicating the messages from node to node (i.e., from device to device) throughout the mesh network. The mesh network devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light, and activate the light source when the ambient light sensor detects that the room is dark and when the occupancy sensor detects that someone is in the room. Further, the sensor can include a low-power wireless communication chip (e.g., a ZigBee chip, a Bluetooth chip, a BLE chip, and so forth) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment as well as over the Internet to a central server or cloud-computing system.

In other configurations, various ones of the mesh network devices can function as "tripwires" for an alarm system in the smart-home environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered mesh nodes in the mesh network. In other implementations, the mesh network can be used to automatically turn on and off the lighting units 808 as a person transitions from room to room in the structure. For example, the mesh network devices can detect the person's movement through the structure and communicate corresponding messages via the nodes of the mesh network. Using the messages that indicate which rooms are occupied, other mesh network devices that receive the messages can activate and/or deactivate accordingly. As referred to above, the mesh network can also be utilized to provide exit lighting in the event of an emergency, such as by turning on the appropriate lighting units 808 that lead to a safe exit. The light units 808 may also be turned-on to indicate the direction along an exit route that a person should travel to safely exit the structure.

The various mesh network devices may also be implemented to integrate and communicate with wearable computing devices, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smart-phone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other mesh network devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the mesh network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the mesh network, conforming to the wireless interconnection protocols for communicating on the mesh network.

The mesh network devices 810 may also include a smart alarm clock for each of the individual occupants of the structure in the smart-home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the mesh network based on a unique signature of the person, which is determined based on data obtained from sensors located in the mesh network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 802 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other mesh network devices can use the data to provide other smart-home objectives, such as adjusting the thermostat 802 so as to pre-heat or cool the environment to a desired setting, and turning-on or turning-off the lights 808.

In implementations, the mesh network devices can also be utilized for sound, vibration, and/or motion sensing such as to detect running water and determine inferences about water usage in a smart-home environment based on algorithms and mapping of the water usage and consumption. This can be used to determine a signature or fingerprint of each water source in the home, and is also referred to as "audio fingerprinting water usage." Similarly, the mesh network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

Figure 9:
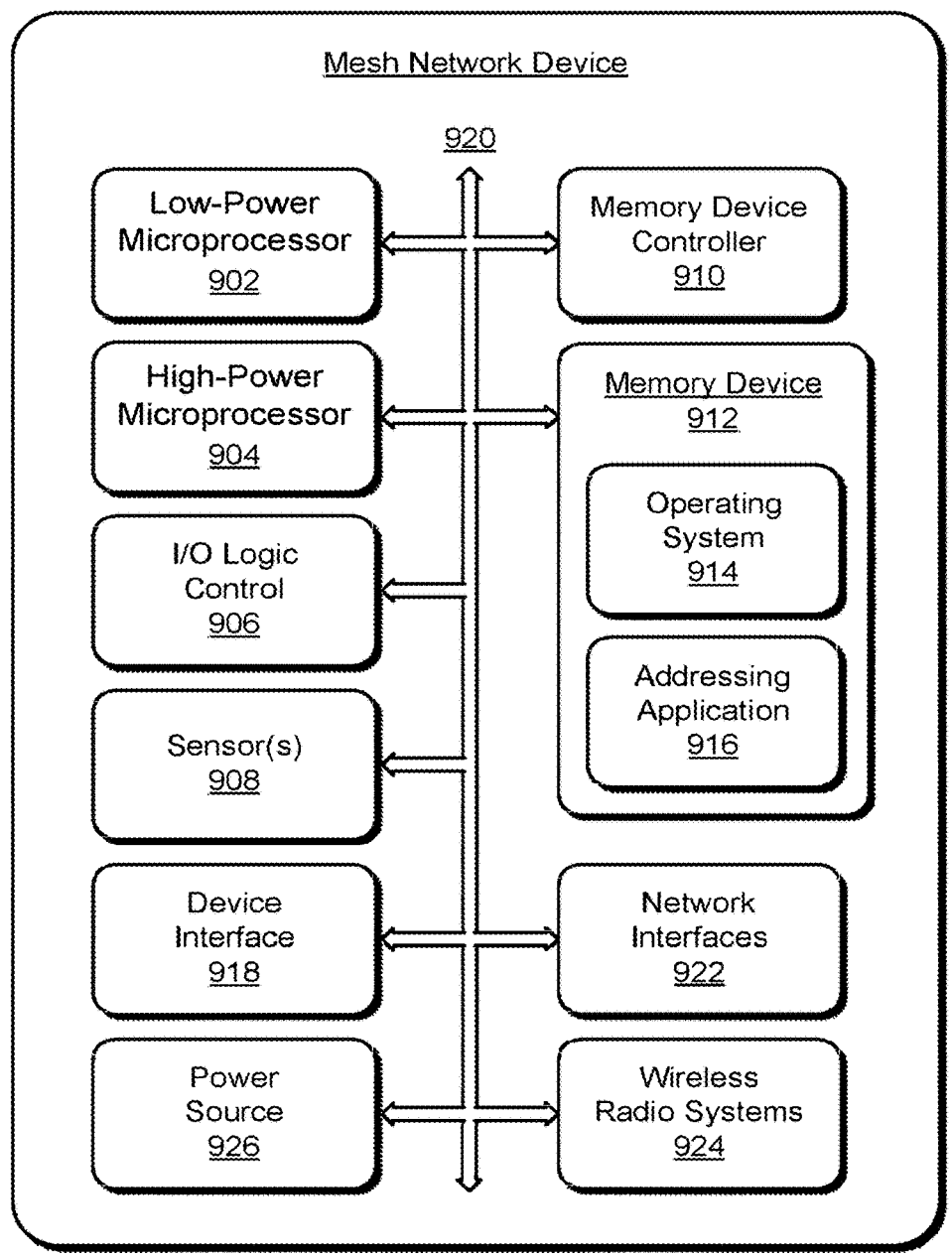
FIG. 9 illustrates an example mesh network device that can be implemented in a mesh network environment in accordance with one or more embodiments of the techniques described herein.

FIG. 9 illustrates an example mesh network device 900 that can be implemented as any of the mesh network devices in a mesh network in accordance with one or more embodiments of virtual addressing for mesh networks as described herein. The device 900 can be integrated with electronic circuitry, microprocessors, memory, input output (I/O) logic control, communication interfaces and components, as well as other hardware, firmware, and/or software to implement the device in a mesh network.

In this example, the mesh network device 900 includes a low-power microprocessor 902 and a high-power microprocessor 904 (e.g., microcontrollers or digital signal processors) that process executable instructions. The device also includes an input-output (I/O) logic control 906 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 902 and the high-power microprocessor 904 can also support one or more different device functionalities of the device. For example, the high-power microprocessor 904 may execute computationally intensive operations, whereas the low-power microprocessor 902 may manage less complex processes such as detecting a hazard or temperature from one or more sensors 908. The low-power processor 902 may also wake or initialize the high-power processor 904 for computationally intensive processes.

The one or more sensors 908 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 908 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and radio frequency identification detectors. In implementations, the mesh network device 900 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or smart-operation objectives.

The mesh network device 900 includes a memory device controller 910 and a memory device 912, such as any type of a nonvolatile memory and/or other suitable electronic data storage device. The mesh network device 900 can also include various firmware and/or software, such as an operating system 914 that is maintained as computer executable instructions by the memory and executed by a microprocessor. The device software may also include an addressing application 916 that implements embodiments of virtual addressing for mesh networks. The mesh network device 900 also includes a device interface 918 to interface with another device or peripheral component, and includes an integrated data bus 920 that couples the various components of the mesh network device for data communication between the components. The data bus in the mesh network device may also be implemented as any one or a combination of different bus structures and/or bus architectures.

The device interface 918 may receive input from a user and/or provide information to the user (e.g., as a user interface), and a received input can be used to determine a setting. The device interface 918 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 918 may also receive inputs from any number of peripherals, such as buttons, a keypad, a switch, a microphone, and an imager (e.g., a camera device).

The mesh network device 900 can include network interfaces 922, such as a mesh network interface for communication with other mesh network devices in a mesh network, and an external network interface for network communication, such as via the Internet. The mesh network device 900 also includes wireless radio systems 924 for wireless communication with other mesh network devices via the mesh network interface and for multiple, different wireless communications systems. The wireless radio systems 924 may include Wi-Fi, Bluetooth™, Mobile Broadband, and/or point-to-point IEEE 802.15.4. Each of the different radio systems can include a radio device, antenna, and chipset that is implemented for a particular wireless communications technology. The mesh network device 900 also includes a power source 926, such as a battery and/or to connect the device to line voltage. An AC power source may also be used to charge the battery of the device.

Although embodiments of virtual addressing for mesh networks have been described in language specific to features and/or methods, the subject of the appended claims is not necessarily limited to the specific features or methods described. Rather, the specific features and methods are disclosed as example implementations of virtual addressing for mesh networks, and other equivalent features and methods are intended to be within the scope of the appended claims. Further, various different embodiments are described and it is to be appreciated that each described embodiment can be implemented independently or in connection with one or more other described embodiments.

What is claimed is:

1. A method of virtual addressing in a mesh network by a mesh network device implemented as a sensor node, the method comprising:
   hashing a unique identifier (UID) to form a UID hash by hashing the UID and a virtual address salt using a Cipher-based Message Authentication Code (CMAC) to generate the UID hash, the UID being associated with an application;
   generating a key identifier, which identifies an application key that is associated with the application, by hashing the application key and a key-identifier salt using the CMAC to produce a first hash result, and hashing the first hash result and a virtual address key salt using the CMAC; and
   forming a virtual address including concatenating an address type indicator and a portion of the UID hash;
   inserting the virtual address in a destination address field of a header of a packet;
   inserting a sensor reading in an application payload field in the packet; and
   transmitting the packet over the mesh network.

2. The method of claim 1, wherein the inserting the virtual address in the packet is effective to enable authentication of the virtual address by one or more mesh network devices that subscribe to data published to the UID.

3. The method of claim 1, wherein the address type indicator indicates the destination address in the destination address field is a virtual address.

4. The method of claim 1, wherein the mesh network is a Bluetooth Low Energy (BLE) network, and wherein the packet is a BLE advertisement packet.

5. The method of claim 1, wherein the transmitting the packet is effective to enable relaying the packet by a node in the mesh network.

6. The method of claim 1, wherein the inserting the virtual address is effective to enable a node at a destination address to authenticate the packet.

7. The method of claim 1, wherein the application publishes data to the UID or subscribes to data published using the UID.

8. The method of claim 1, wherein the UID is one of a 128-bit Universally Unique Identifier (UUID), a 64-bit Extended Unique Identifier (EUI-64), a 48-bit Media Access Control address (MAC-48), a 32-bit address, a 128-bit IPv6 address, a radio interface address, null-terminated string or label, or a JPEG image.

9. A method of virtual addressing in a mesh network by a destination node, the method comprising:
   receiving, by the destination node, a packet over the mesh network;
   determining that an address type indicator indicates that a destination address in a destination address field of the packet includes a virtual address;
   disambiguating the virtual address in the received packet, the disambiguation using a unique identifier (UID) to determine that the virtual address corresponds to a known UID that is provisioned to the destination node by comparing hashes to disambiguate that there is a mapping of the virtual address to the known UID; and
   authenticating a packet payload using the UID as additional data, a successful authentication of the packet payload indicating that the virtual address is correctly addressing the destination node.

10. The method of claim 9, wherein the packet is received from a source node, and wherein the source node generates the virtual address for the received packet.

11. The method of claim 10, wherein the virtual address is associated with an application that uses capabilities of the source node or uses capabilities of the destination node.

12. The method of claim 9, wherein the mesh network is a Bluetooth Low Energy (BLE) network, and wherein the packet is a BLE advertisement packet.

13. The method of claim 9, wherein the UID is one of a 128-bit Universally Unique Identifier (UUID), a 64-bit Extended Unique Identifier (EUI-64), a 48-bit Media Access Control address (MAC-48), a 32-bit address, a 128-bit IPv6 address, a radio interface address, null-terminated string or label, or a JPEG image.

14. A method of virtual addressing in a mesh network by a source node, the method comprising:
   hashing, by the source node, a unique identifier (UID) to form a UID hash;
   generating a key identifier that identifies an encryption key associated with the UID;
   setting an address type indicator to indicate that a destination address is a virtual address;
   forming the virtual address including concatenating the address type indicator and a portion of the UID hash;
   inserting the virtual address in a destination address field of a header of a packet; and
   transmitting the packet over the mesh network to a destination node, the transmitting directing a destination mesh network device to:
      determine that the address type indicator indicates that the destination address in the destination address field of the packet includes the virtual address;
      disambiguate the virtual address in the received packet, the disambiguation using the UID to determine that the virtual address corresponds to a known UID that is provisioned to the destination node; and
      authenticate a packet payload using the UID as additional data.

15. The method of claim 14, wherein, to disambiguate the virtual address, the destination node is configured to compare hashes to disambiguate that there is a mapping of the virtual address to the known UID, and wherein successful authentication of the packet payload indicates that the virtual address is correctly addressing the destination node.

16. The method of claim 14, wherein transmitting the packet over a mesh network to the destination node further comprises:
   transmitting the packet to a relay node in the mesh network that is configured to:
      receive the transmitted packet from the source node; and relay the received packet, using the mesh network, wherein the destination node receives the relayed packet.

17. The method of claim 14, wherein the virtual address is associated with an application that uses capabilities of the source node or uses capabilities of the destination node.

18. The method of claim 17, wherein the application publishes data to the UID or subscribes to data published using the UID.

19. The method of claim 14, wherein the destination node is provisioned with multiple UIDs, wherein to disambiguate the virtual address in the packet, the destination node is configured to disambiguate the virtual address for each of the multiple UIDs, and wherein each of the multiple UIDs is associated with a different application.

20. The method of claim 14, wherein the mesh network is a Bluetooth Low Energy (BLE) network, and wherein the packet is a BLE advertisement packet.

* * * * *